United States Patent
Collins et al.

(10) Patent No.: US 6,308,636 B1
(45) Date of Patent: Oct. 30, 2001

(54) IN-VEHICLE SWITCH MECHANISM

(75) Inventors: David C. Collins, Burlington; Albert E. Lewis, Mattapan; Gerald A. Garneau, Jr., Hudson, all of MA (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/438,732

(22) Filed: Nov. 11, 1999

(51) Int. Cl.⁷ .............................. E01B 25/06; E01B 7/00
(52) U.S. Cl. .................. 104/130.01; 104/243; 246/415 R
(58) Field of Search .................. 104/130.01, 130.07, 104/242, 243, 245; 246/415 R (56) References Cited

U.S. PATENT DOCUMENTS

| | | |
|---|---|---|
| 989,958 | 9/1911 | Frahm . |
| 2,016,207 | 10/1935 | Lindenberg . |
| 2,503,120 | 4/1950 | Meyer . |
| 2,744,749 | 5/1956 | Fiedor . |
| 2,887,071 | 5/1959 | Settles . |
| 2,901,239 | 8/1959 | Sethna . |
| 3,673,966 | 7/1972 | Wilson . |
| 3,675,583 | 7/1972 | Sobey et al. . |
| 3,788,233 | 1/1974 | Colovas et al. . |
| 3,811,383 | 5/1974 | Butzow . |
| 3,814,025 | 6/1974 | Nelson . |
| 3,831,527 | * 8/1974 | Peterson .............................. 104/130 |
| 3,881,427 | 5/1975 | Blume . |
| 3,913,491 | 10/1975 | Auer et al. . |
| 3,977,487 | 8/1976 | Katayose et al. . |
| 4,092,930 | 6/1978 | Takemura et al. . |
| 4,183,304 | 1/1980 | Forster . |
| 4,223,611 | 9/1980 | Dawson et al. . |
| 4,259,810 | 4/1981 | West . |
| 4,265,180 | 5/1981 | Uozumi . |

(List continued on next page.)

FOREIGN PATENT DOCUMENTS

| | | |
|---|---|---|
| 1 161 936 | 1/1964 | (DE) . |
| 14 05 857 A | 6/1970 | (DE) . |
| 34 13 224 A | 11/1985 | (DE) . |
| 40 32 378 | 4/1992 | (DE) . |
| 43 01 986 A | 7/1994 | (DE) . |
| 198 28 393 A1 | 7/1999 | (DE) . |
| 88 241 A | 9/1983 | (EP) . |
| 88 241 B1 | 9/1983 | (EP) . |
| 464 720 A1 | 1/1992 | (EP) . |
| 625 815 A2 | 11/1994 | (EP) . |
| 747 281 A2 | 12/1996 | (EP) . |
| 747 281 A3 | 8/1997 | (EP) . |
| 605894 | 6/1926 | (FR) . |
| 2 652 375 | 3/1991 | (FR) . |
| 1 118 853 A | 7/1968 | (GB) . |
| WO98 46467 | 10/1998 | (SE) . |

*Primary Examiner*—S. Joseph Morano
*Assistant Examiner*—Robert J. McCarry, Jr.
(74) *Attorney, Agent, or Firm*—Iandiorio & Teska (57) ABSTRACT

An in-vehicle switch mechanism for guiding a vehicle along a guideway at converging and diverging points of the guide rails in a guided vehicle system includes a support frame; a pivot assembly; a switch arm assembly pivotably mounted at its proximate end to the pivot assembly; a switch wheel rotatably mounted to the switch arm assembly at its distal end; an actuator for moving the switch arm between a deployed position in which the switch wheel engages a guide rail and a stowed position in which the switch wheel is free of the guide rail; and a biasing device interconnected between the support frame and pivot assembly for preloading the switch wheel against the guide rail when the switch wheel is deployed as the vehicle approaches the point of divergence; and an in-vehicle switch system which uses such in-vehicle switch mechanisms.

20 Claims, 8 Drawing Sheets

U.S. PATENT DOCUMENTS

| | | |
|---|---|---|
| 4,267,779 | 5/1981 | Binder . |
| 4,436,170 | 3/1984 | Mehren et al. . |
| 4,522,128 | 6/1985 | Anderson . |
| 4,644,692 | 2/1987 | Schindehutte . |
| 4,671,185 | 6/1987 | Anderson et al. . |
| 4,708,695 | 11/1987 | Sugiyama . |
| 4,765,648 | 8/1988 | Mander et al. . |
| 4,798,254 | 1/1989 | Lings . |
| 4,803,804 | 2/1989 | Bryant . |
| 4,953,472 | 9/1990 | Tutzer . |
| 4,960,290 | 10/1990 | Bose . |
| 5,067,608 | 11/1991 | McLellan . |
| 5,094,312 | 3/1992 | Hakel . |
| 5,148,631 | 9/1992 | Bayard et al. . |
| 5,277,124 * | 1/1994 | DiFonso et al. ..................... 104/130 |
| 5,431,261 | 7/1995 | Olgac . |
| 5,443,282 | 8/1995 | Gipser . |
| 5,551,190 | 9/1996 | Yamagishi et al. . |
| 5,558,191 | 9/1996 | Lai . |
| 5,755,059 | 5/1998 | Schap . |
| 5,832,665 | 11/1998 | Miller et al. . |
| 5,845,581 * | 12/1998 | Svensson ............................. 104/120 |
| 5,848,663 | 12/1998 | Kuriki . |
| 5,906,071 | 5/1999 | Buchanan, Jr. . |
| 5,921,026 | 7/1999 | Miller . |
| 5,979,114 | 11/1999 | Clark et al. . |
| 6,120,401 | 9/2000 | Wilken . |

\* cited by examiner

IN-VEHICLE SWITCH MECHANISM

FIELD OF INVENTION

This invention relates to an improved in-vehicle switch mechanism for a guided vehicle.

BACKGROUND OF INVENTION

Conventional laterally guided vehicles rely on lateral guideways to stabilize and direct them along the guideway. A switching mechanism is used to select one of two pathways when a vehicle approaches an intersection. The guideway itself has no moving parts and switching of the vehicle at diverging and converging points of the guideway is accomplished by forcing the vehicle to adhere to one side of the guideway while approaching a point of divergence with the system. One problem with such mechanisms is that when the vehicle enters an intersection the bilateral guiding is lost and so the vehicle is apt to be less stable and can hunt from side to side causing head-toss and other passenger discomfort.

SUMMARY OF INVENTION

It is therefore an object of this invention to provide an improved in-vehicle switch mechanism and an in-vehicle switch system using such a switch mechanism.

It is a further object of this invention to provide such an improved in-vehicle switch mechanism which develops a preload between the switch wheels and guide rail to provide a stable ride without hunting, head-toss and other passenger discomfort.

It is a further object of this invention to provide such an improved in-vehicle switch mechanism which monitors the position of the switch wheels as well as their wear and presence.

It is a further object of this invention to provide such an improved in-vehicle switch mechanism which enables accommodation of the preload to maintain proper loading for secure and comfortable engagement even with wear.

It is a further object of this invention to provide such an improved in-vehicle switch mechanism in which the switch wheels once engaged with the guide rail are mechanically locked in place.

It is a further object of this invention to provide such an improved in-vehicle switch mechanism in which the switch wheels once engaged with the guide rail are kept properly oriented.

It is a further object of this invention to provide such an improved in-vehicle switch mechanism in which the switch wheels are enabled to maintain full face contact with the guide rails.

It is a further object of this invention to provide such an improved in-vehicle switch mechanism which is self-aligning when engaged with the guide rail and engagement is maintained even under severe wear conditions or when the switch wheel is missing.

It is a further object of this invention to provide such an improved in-vehicle switch mechanism which confirms engagement of the switch wheel and guide rail.

The invention results from the realization that a truly safe and stable guided vehicle for a guided vehicle system which securely engages the guideway even where the vehicle approaches a divergence in the guide rail can be achieved by using an in-vehicle switch mechanism including a biasing device to urge the switch wheel to exert a preload force against the guide rail in areas of divergence.

This invention features an in-vehicle switch mechanism for guiding a vehicle along a guideway at converging and diverging points of the guide rails in a guided vehicle system. There is a support frame, a pivot assembly, and a switch arm assembly pivotably mounted at its proximate end to the pivot assembly. A switch wheel is rotatably mounted to the switch arm assembly at its distal end. An actuator moves the switch arm between a deployed position in which the switch wheel engages the guide rail and a stowed position in which the switch wheel is free of the guide rail. A biasing device interconnected between the support frame and pivot assembly pre-loads the switch wheel against the guide rail when the switch wheel is deployed as the vehicle approaches a point of divergence.

In a preferred embodiment the pivot assembly may include first and second spaced pivot units. The pivot assembly may include first and second pivot arms, the proximate end of each pivot arm being connected to one of the pivot units, the distal end of the pivot arm being connected to a spindle housing. The spindle housing may include a shaft for rotatably supporting the switch wheel. The biasing device may include a spring member and it may include a spring member associated with each of the pivot units. The actuator may be mounted with the pivot assembly. The biasing device may include an adjustment member for varying the force applied by the biasing device. The pivot axis of the pivot assembly may be generally aligned with the switch wheel. The actuator may be resiliently interconnected between the pivot assembly and the switch arm assembly. The actuator may be resiliently mounted to the pivot assembly. There may be an anti-roll device for maintaining alignment between the switch wheel and guide rail. The biasing device may include a limiter member for limiting the movement of the switch wheel relative to and maintaining a mechanical interference lock with the guide rail. The pivot assembly may include a sensor for detecting the position of the switch arm assembly. The biasing device may include a sensor for detecting the engagement of the switch wheel and guide rail.

The invention also features an in-vehicle switch system for guiding a vehicle along a guideway at converging and diverging points of the guide rails in a guided vehicle system. The in-vehicle switch system includes first and second switch mechanisms each including a support frame, a pivot assembly, and a switch arm assembly pivotably mounted at its proximate end to the pivot assembly. Each in-vehicle switch mechanism also includes a switch field rotatably mounted to the switch arm assembly at its distal end, an actuator for moving the switch arm between a deployed position in which the switch wheel engages the guide rail and a stowed position in which the switch wheel is free of the guide rail, and a biasing device interconnected between the support frame and pivot assembly for pre-loading the switch wheel against the guide rail when the switch wheel is deployed as the vehicle approaches a point of divergence.

In a preferred embodiment there may be a limiter link interconnected between the pivot assemblies for constraining one switch wheel to be stowed while the other is deployed. The biasing device may include a limiter member for limiting the movement of the switch wheel relative to and maintaining an interference lock with the guide rail. There may be a lateral suspension system including first and second lateral guide wheels for engaging the guide rails, one guide wheel rotatably mounted with each of the support frames, and a biasing system interconnecting the support frame for biasing the lateral guide wheels against the guide rails in opposition to the switch wheels when they are engaged with the guide rails.

DISCLOSURE OF PREFERRED EMBODIMENT

Other objects, features and advantages will occur to those skilled in the art from the following description of a preferred embodiment and the accompanying drawings, in which.

Figure 1:
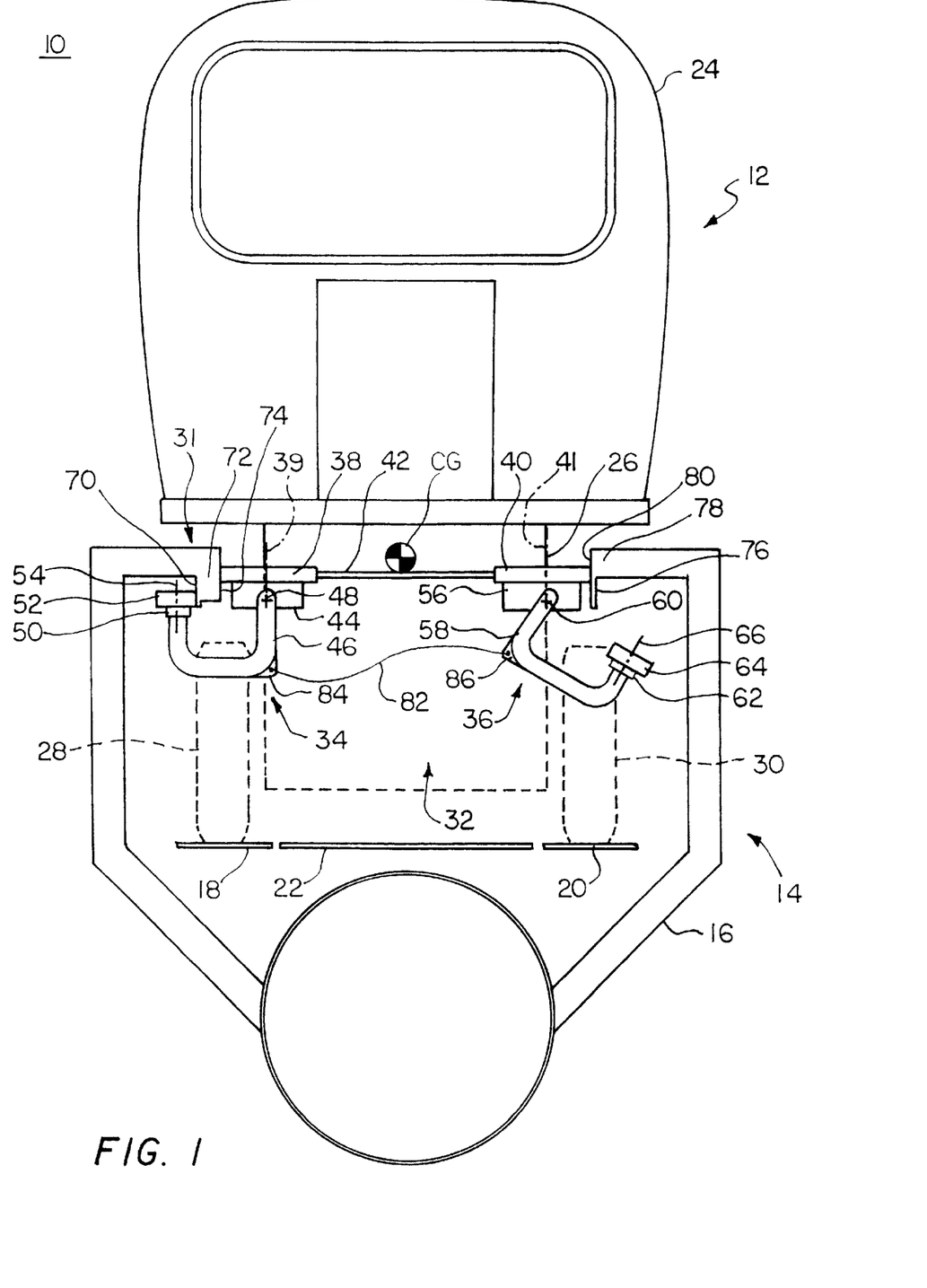
FIG. 1 is a schematic end view of a guided vehicle and guideway of a guided vehicle system using the in-vehicle switch mechanisms according to this invention.

There is shown in FIG. 1 a guided vehicle system 10 including a vehicle 12 which moves on a guideway 14. Guideway 14 includes a support structure including main running surfaces 18 and 20 and a walkway or grate 22. Guided vehicle 12 includes cabin 24 mounted on chassis 26 which rolls on four main support tires only two of which, 28 and 30, are shown, supported on running surfaces 18 and 20. Mounted on chassis 26 is a lateral suspension assembly 31 and an in-vehicle switch system 32 including two in-vehicle switch mechanisms 34 and 36 shown very simply schematically. Lateral suspension system 31 and in-vehicle switch mechanisms 36, 34 are shown approximately aligned with the CG of the vehicle for the purpose of stability and reducing deleterious forces as will be understood hereafter. A lateral suspension system is shown in copending application filed on even date herewith, "Lateral Suspension Assembly for a Guided Vehicle Systems", by David C. Collins, Albert E. Lewis, and Gerald A. Garneau, Jr. This application is assigned to Raytheon Company and is incorporated herein by reference in its entirety.

Lateral suspension system 31 includes lateral guide wheels 38 and 40 rotatable about axes 39 and 41 interconnected by a lateral limit link 42. The lateral outward travel of guide wheels 38 and 40 is limited by lateral limit link 42. Both guide wheels 38 and 40 are urged outwardly by spring biasing means as will be explained hereinafter and is shown in greater detail in the applications cited supra. Lateral guide wheel 38 shares support frame 44 with switch arm assembly 46 of in-vehicle switch mechanism 34. Switch arm assembly 46 is rotatable about pivot axis 48 and includes a spindle housing 50 which supports switch wheel 52 rotatable about axis 54. Similarly, lateral guide wheel 40 shares support frame 56 with in-vehicle switch mechanism 36. Switch arm assembly 58 is rotatable about pivot axis 60 at its proximate end and at its distal end includes a spindle housing 62 which rotatably supports switch wheel 64 that rotates about axis 66. Switch mechanism 34 is shown with the switch arm assembly 46 in the deployed position so that switch wheel 52 is engaging the outside or switching surface 70 of guide rail 72 while the inside or guiding surface 74 of guide rail 72 is engaged with lateral guide wheel 38. In contrast, switch arm assembly 58 is in the stowed position so that switch wheel 64 is out of contact with switching surface 76 of guide rail 78 while lateral guide wheel 40 engages the guiding surface 80 of guide rail 78. A limiter member 82 is interconnected between mount 84 of switch mechanism 34 and mount 86 of switch mechanism 36. Limiter member 82 ensures that one and only one of switch arm assemblies 46 and 58 can be in the deployed position when lateral limit link 42 is extended. In the subsequent discussion of the figures like parts have been given like numbers and similar parts like numbers accompanied by a lower case letter or prime.

Figure 2:
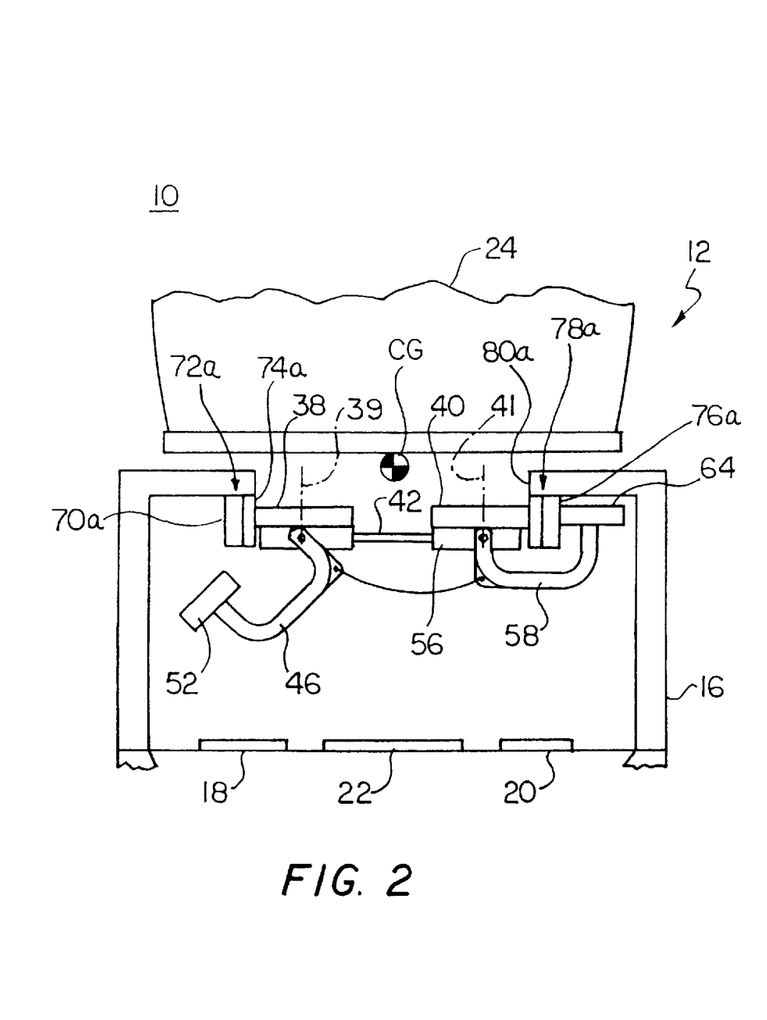
FIG. 2 is a view similar to FIG. 1 with parts removed for clarity showing a lateral suspension system combined with two in-vehicle switch mechanisms, one stowed and one deployed, a section of guideway along line 2—2 of FIG. 3.

When a car approaches a merge/diverge section in the guideway where the guide rails will depart from their normal parallelism, one of the paths available will be chosen for the vehicle. As shown in FIG. 2, with the vehicle 12 moving into the paper approaching a diverge section the path to the right has been chosen, so the switch arm assembly 58 has been deployed while switch arm assembly 46 is stowed. At this point guide rails 72a and 78a increase in width so as to move the switch wheel of the deployed switch arm assembly farther away from the support housing and produce a pre-loading of the switch wheel against the switching surface. For example, in FIG. 2 switch arm assembly 58 has been deployed and the increased width or thickness of guide rail 78a moves switching surface 76a and thus moves switch wheel 64 outwardly with respect to support housing 56 so that a pre-loading force is applied by switch wheel 64 against switching surface 76a. Switch wheel 52 of switch arm assembly 46 is not in contact with switching surface 70a. Lateral guide wheels 38 and 40 are in contact with guiding surfaces 74a and 80a.

Figure 3:
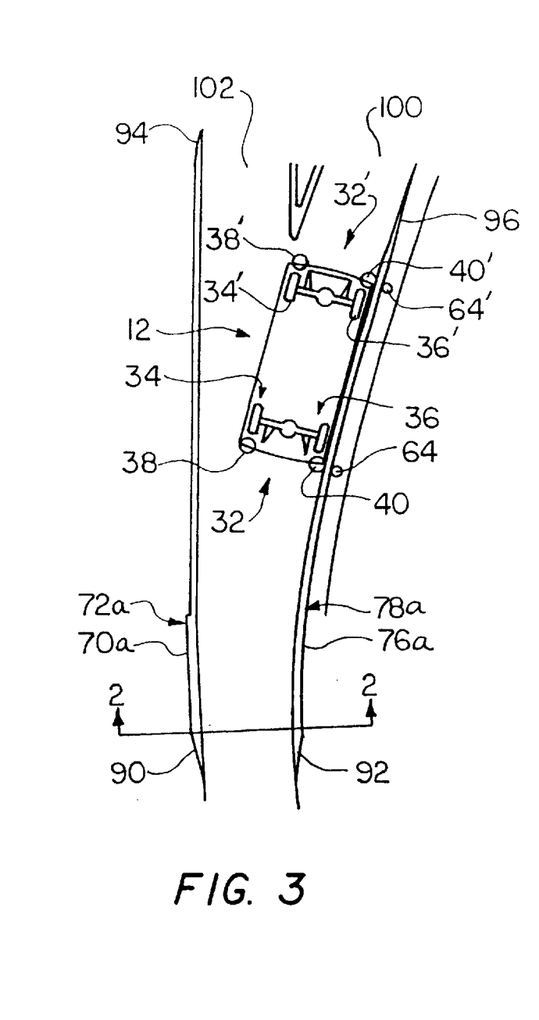
FIG. 3 is a top plan view of the guideway of FIG. 2.

The switching surfaces 70a and 76a begin with a camming surface 90, 92, FIG. 3, that gradually moves the deployed switch wheel away from its support frame and pre-loads it against the switch rail. Such camming surfaces are employed at both ends as shown, for example, by camming surfaces 94 and 96. Vehicle 12 in FIG. 3 is shown as having selected the right hand path 100 as opposed to the left hand path 102, so that switch wheel 64 of switching mechanism 36 is deployed and engaging switching surface 76a under a pre-load force while the switch wheel, not shown, of switch mechanism 34 does not engage with the switching surface 70a while the switch arm assembly is in the stowed position. Lateral guide wheel 38 is also out of contact with guide rail 72a while lateral guide wheel 40 is in contact with guide rail 78a. The same configuration occurs in vehicle switch system 32' at the front of vehicle 12 where in vehicle switch mechanisms 34' and 36' are configured accordingly.

Lateral suspension system 31 and in-vehicle switch system 32 are shown in greater detail in FIGS. 4, 5 and 6 taken together in the following discussion. Lateral suspension system 31 includes lateral guide wheels 38 and 40 mounted in support frames 44 and 56 for rotation about their respective axes 39 and 41. Support frames 44 and 56 each are pivotally supported by a clevis 110, 112 where they interconnect with lateral limit link 42. Clevises 110 and 112 are carried in turn by supports 114 and 116 which are pivotably attached to chassis 26 at points not shown. A bias device such as spring 118 is attached at one end by clevis 120 to cross bar 122 of chassis 26. At its other end spring 118 is attached to clevis 123 fixed to arm 116. In this way spring 118 provides a constant force urging lateral guide wheel 40 outwardly to engage a guide rail. Spring 118 may include a shock absorber 124 for damping the action of spring 118 and maintaining a smooth constant contact of wheel 40 with its associated guide rail. A second spring 126 is mounted to clevis 128 which is fixed to the underside of cross bar 122. The other end of spring 126 is attached to clevis 130 which is fixed to support 114. It also may include a shock absorber 132 (shown in phantom) so that spring 126 provides a constant force to keep wheel 38 against its associated guide rail. Lateral limit link 42 ensures that even under the urging of springs 118 and 126 lateral guide wheels 38 and 40 will not go beyond a predetermined safe limit even when the guide rails diverge.

Figure 4:
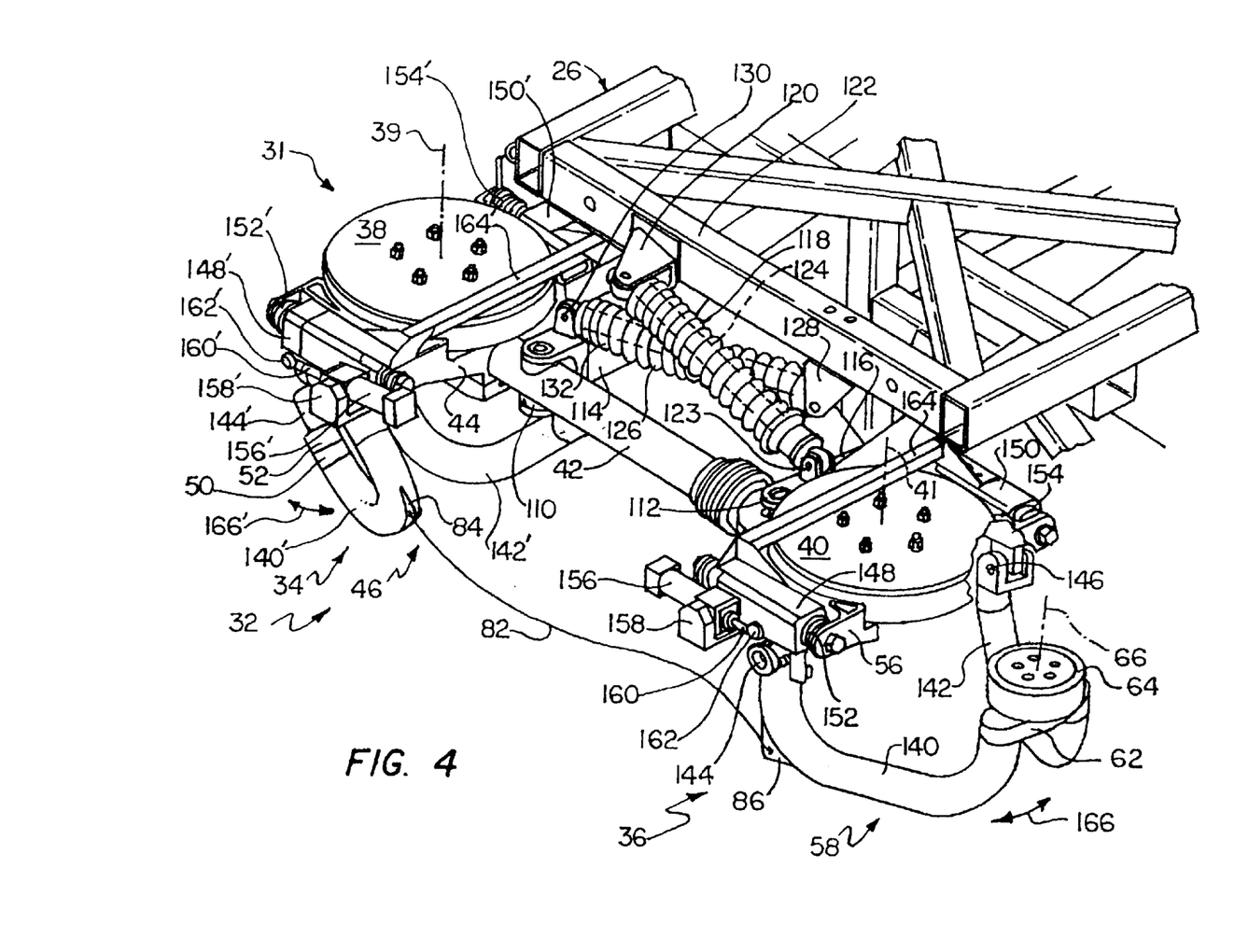
FIG. 4 is a three-dimensional view of two in-vehicle switch mechanisms according to this invention, a lateral suspension system and vehicle chassis frame.
Figure 5:
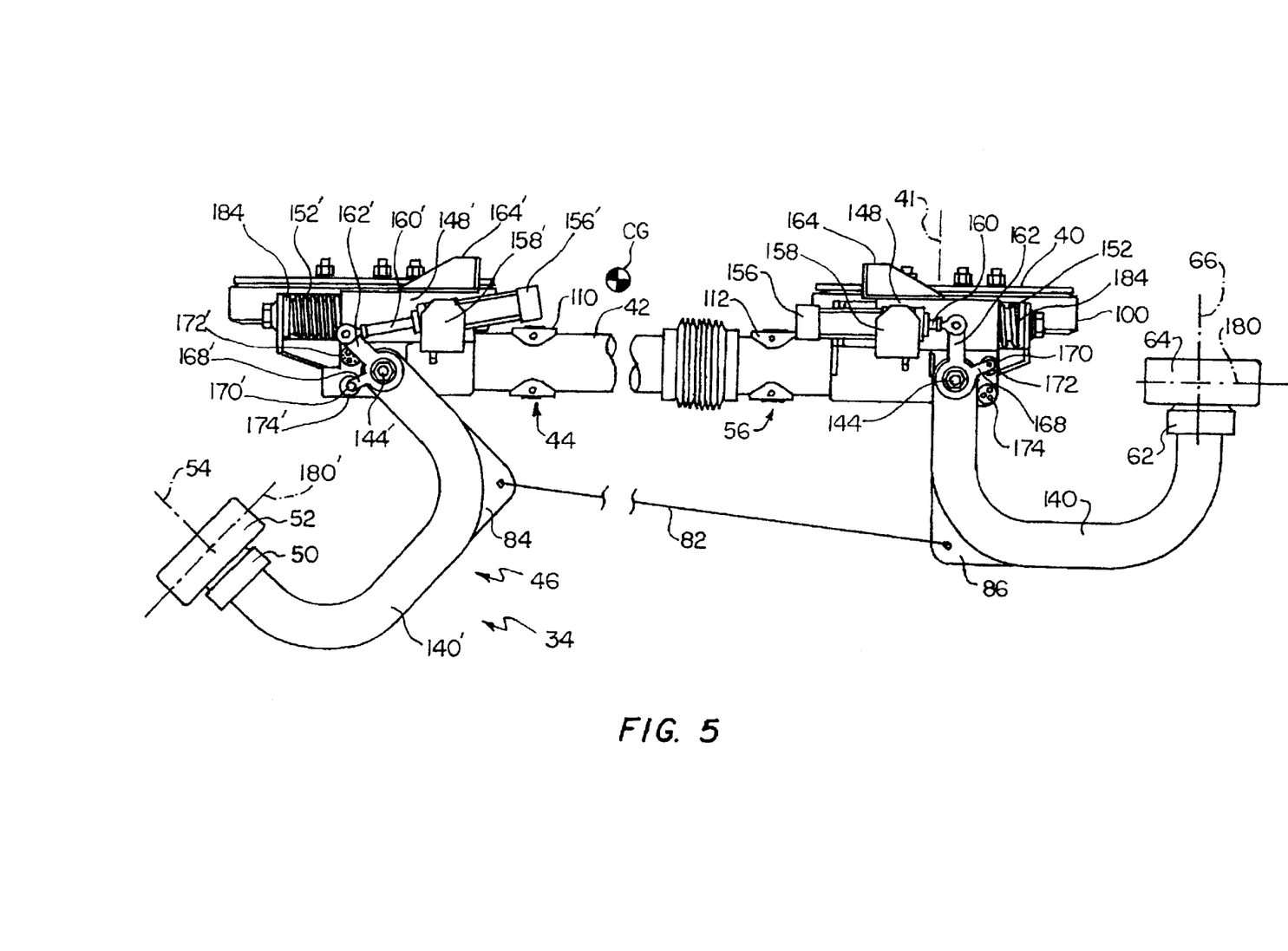
FIG. 5 is a diagrammatic front elevational view of the lateral suspension system and in-vehicle switch mechanisms of FIG. 4.
Figure 6:
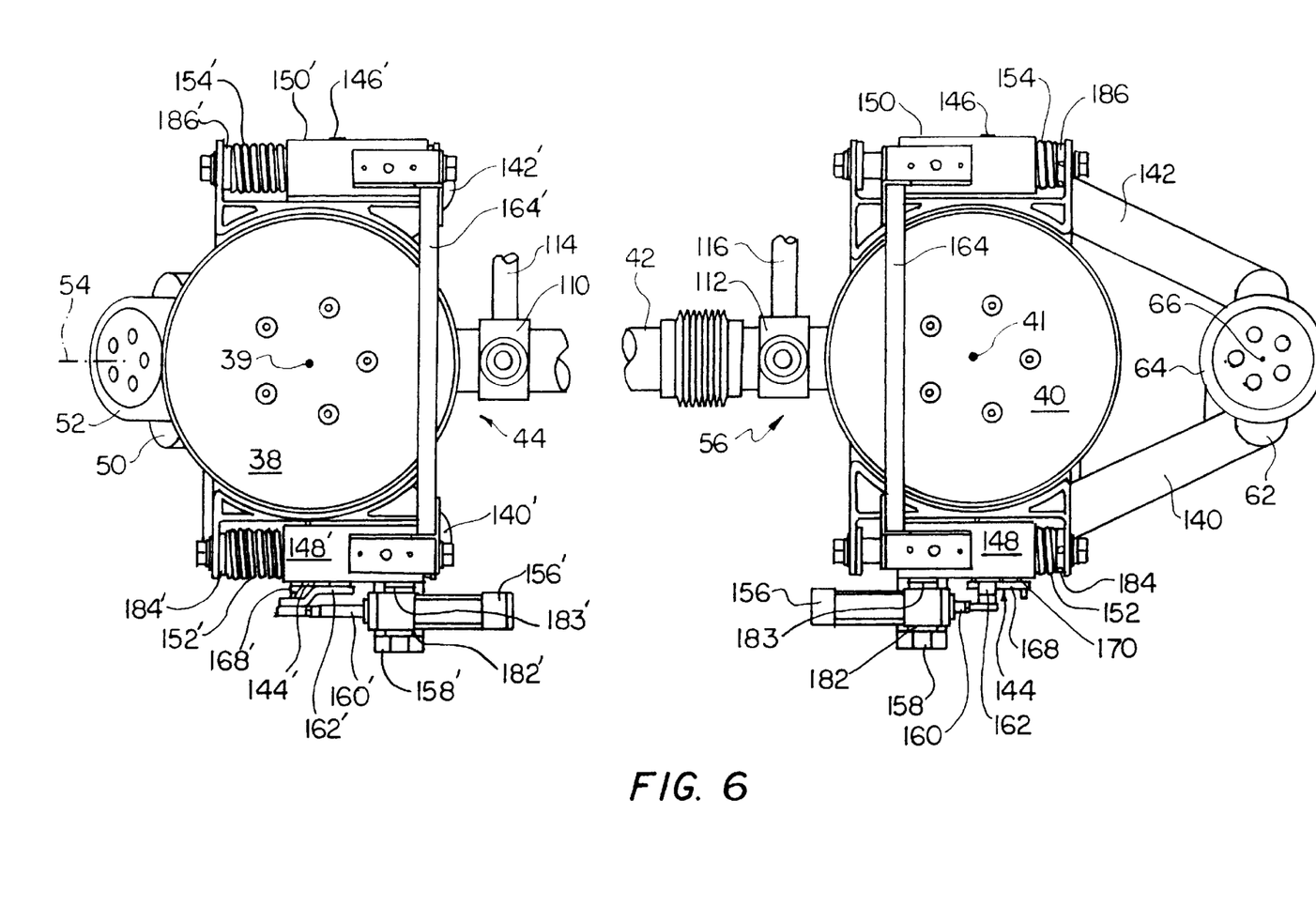
FIG. 6 is a top plan view similar to FIG. 5.

Both in-vehicle switch mechanisms 34 and 36 of in-vehicle switch system 32 are shown in FIGS. 4, 5 and 6. In each of these figures switch assembly 58 is shown deployed while switch assembly 46 is shown stowed. A description of in-vehicle switch mechanism 36 will suffice to explain the operation of the identical in-vehicle switch mechanism 34. Switch arm assembly 58 actually includes a pair of arms 140, 142 which support spindle 62. Each arm is connected at pivots 144, 146. Pivots 144 and 146 are on pivot assembly which includes two pivot units 148 and 150. Pivot units 148 and 150 are interconnected with the support frame by a biasing means, in this case two springs 152 and 154 which provide a force that drives the pivot assembly, and thus arms 140 and 142, and switch wheel 64 inwardly so that it grips and engages the switching surface of its associated guide rail. In other constructions the springs may provide a force that drives the arms and switch wheel outwardly. An actuator, typically an electrically or hydraulically driven solenoid, 156 mounted in bracket 158 fixed to pivot unit 148 drives arms 140 and 142 between the deployed and the stowed positions by means of piston 160 and link 162. An anti-roll bar 164 is interconnected between pivot units 148 and 150 to prevent arms 140 and 142 of switch arm assembly 58 from undesirably canting or rotating in the direction of arrow 166.

As can be seen more clearly in FIG. 5, link 162 includes an arm 168 which carries magnet 170. Directly beneath magnet 170 on pivot unit 148 is a triple redundant Hall effect sensor 172 which senses when magnet 170 is opposite it to give an indication that switch wheel 64 is in a deployed position. When through the action of actuator 156 arm 140 is in the stowed position then piston 160 will be in the extended position and arm 168 will be rotated downwardly so that magnet 170 is over a second triple redundant Hall effect sensor 174 indicating that switch wheel 64 is in the stowed position. This is the situation shown with respect to switch assembly 46. Note that pivot 144 is substantially in line with the center line 180 of switch wheel 64. This is done to reduce effectively to zero any moments that would tend to urge wheel 64 away from its engagement with its associated guide rail.

An adjustment wheel 184 is used to adjust spring 152 and adjustment wheel 186 is used to adjust spring 154 to provide the proper inward force on wheel 64. Adjustment wheel 186 is visible in FIG. 6. Also visible in FIG. 6 is actuator 156 connected to bracket 158 by means of rubber mounting 182 and 183 in order to accommodate minor misalignments such as caused by the arcuate motion of arm 162.

Figure 7:
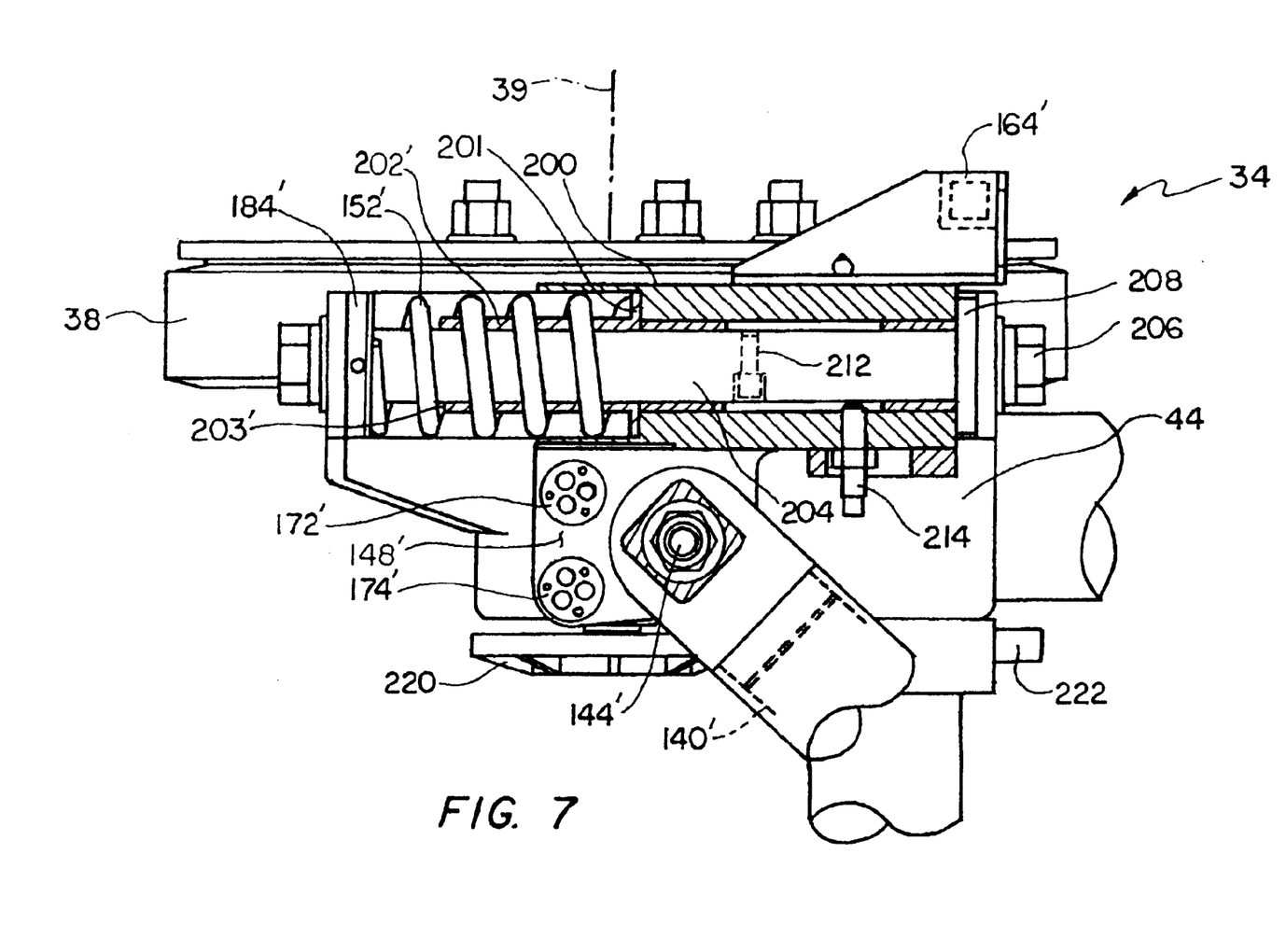
FIG. 7 is an enlarged detailed diagrammatic sectional view of a biasing device and pivot assembly of an in-vehicle switch mechanism in FIGS. 4–6.

One construction of the biasing device is shown with reference to FIG. 7, where spring 152' is disposed between adjustment wheel 184' and slide mount 200 which is integral with pivot unit 148'. Captured between spring 152' and slide mount 200 is the flange 201 of stop 202'. The other end 203 of stop 202' engages with adjuster 184' to limit the motion of slide mount 200. This limits the distance which switch wheel 52 (not shown) can move in order to prevent it from escaping from its interference locked position, as will be explained with reference to FIG. 8. Shaft 204 is secured to housing 44. Rubber shock absorber 208 absorbs the energy when slide mount 200 is unloaded. A sensor pair is provided including, for example, a magnetic member 212 fixed to shaft 204 and a Hall effect sensor 214 mounted to slide mount 200. Thus when switch wheel 52 is deployed on the end of arms 140' and 142' and spring 152' is partially compressed, member 212 and Hall effect sensor 214 will be aligned indicating that switch wheel 52 is deployed and forcibly engaged with the switch surface of the guide rail. If the two do not align when Hall effect sensor 172' indicates that switch wheel 52 is indeed deployed, then the system can determine that either switch wheel 52 is broken, missing, or worn. An encoder wheel 220 rotatable with lateral guide wheel 38 and an encoder sensor 222 may be used to constantly sense the position and movement of guide wheel 38 and thus the position and motion of the entire vehicle.

Figure 8:
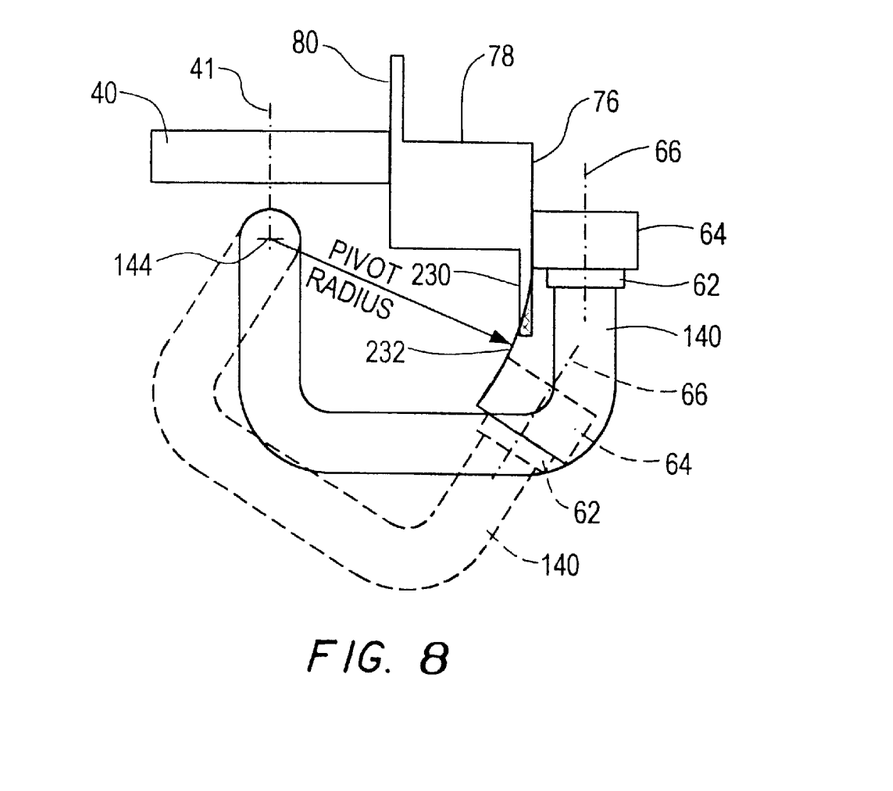
FIG. 8 is a schematic front elevational view of the switch arm assembly illustrating the interference lock in the deployed position.

The interference lock which prevents a switch wheel in a deployed and engaged position from dropping away to the stowed position or some intermediate, equally problematic position, is shown in FIG. 8, where it can be seen that the switching surface 76 of guide rail 78 has an extended portion 230 which extends down below the arc 232 through which the inner end of switch wheel 64 must pass in order to swing down and clear guide rail 78 to move from the deployed engaged position, shown in full line, to the stowed position, shown in dashed lines.

Figure 9:
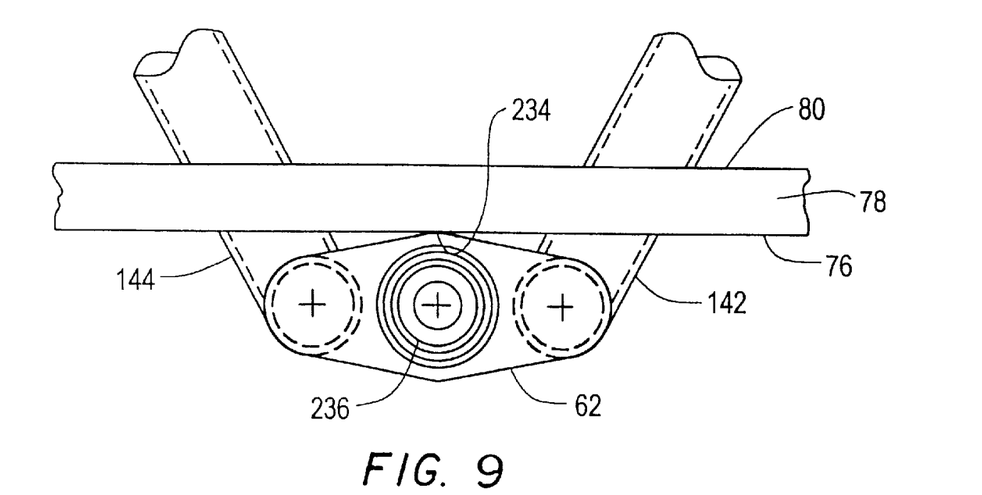
FIG. 9 is a schematic top plan view of the spindle housing and shaft that rotatably support a switch wheel.

Switch mechanisms 34 and 36 are constructed so that even if a switch wheel, e.g., switch wheel 64, is worn down, broken, or entirely missing and an alarm is sent by sensors 212 and 214, the system will still operate safely until the vehicle can be taken off line for repairs. This is shown in FIG. 9 where it can be seen that spindle 62 is shaped to have a rounded portion 234 which is suitable for contacting and sliding along switching surface 76 of guide rail 78 even with the wheel completely missing and only the shaft 236 remaining.

Figure 10:
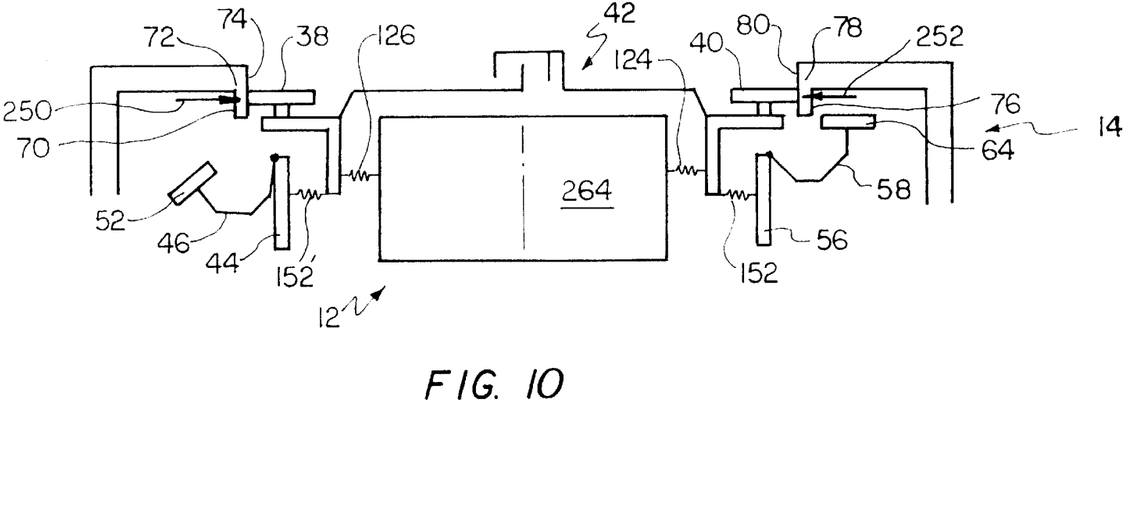
FIGS. 10 and 11 schematic equivalent diagrams showing the opposing vehicle stabilizing forces applied to the guide rail by the lateral guide wheels and switch.
Figure 11:
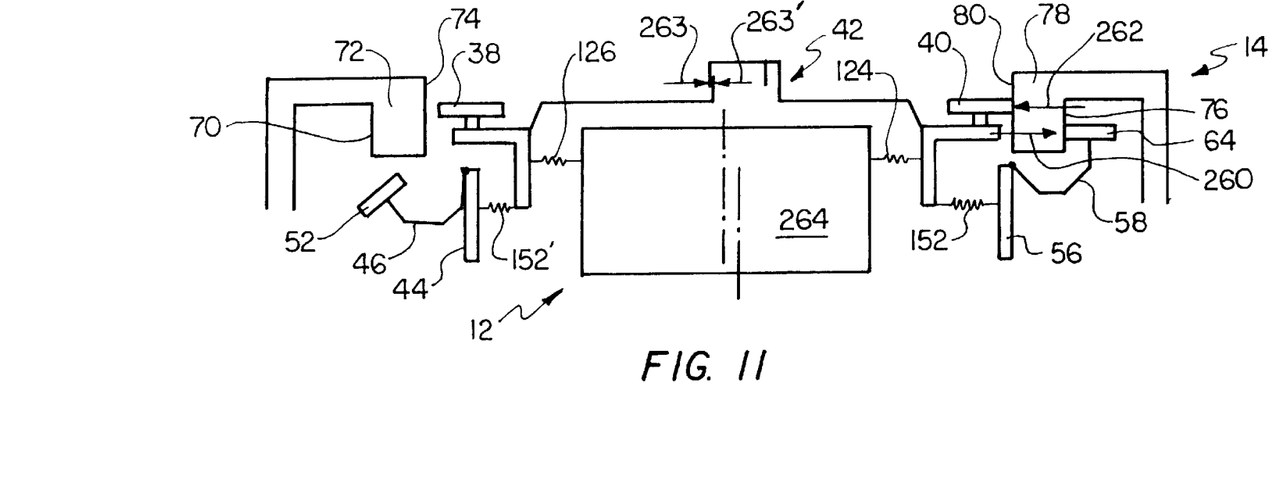

An in-vehicle switch system using two switch mechanisms as shown in this invention, when combined with a lateral suspension system as shown in the application cited supra, always controls the vehicle as a sprung mass, whether securely moving between a pair of guide rails in the normal parallel configuration or between diverging guide rails in a merging or diverging transition. This can be seen more clearly in FIGS. 10 and 11 where the vehicle as a sprung mass is shown in FIG. 10 in a non-switch region where guide rails 72 and 78 are narrow so that their guiding surfaces and switching surfaces are close. In FIGS. 10 and 11 limiter member 82 has been omitted for clarity. In that condition, with switch wheel 64 deployed and switch wheel 52 stowed, the springs 152 and 152' do not contribute to the control of the vehicle. Rather, in this condition it is springs 126 and 124 which urge lateral guide wheels 38 and 40 against their respective suspension rails 74 and 80 providing two opposing forces as shown by vectors 250 and 252 in FIG. 10. In FIG. 11, when the vehicle has entered a switch region guide rails 72 and 78 are enlarged so that the distance between their respective switching surfaces 70, 76 and guiding surfaces 74, 80, has increased. In this condition one of the lateral guide wheels 38 is no longer urged against its guiding surface 74 and switch wheel 52 has no engagement with switching surface 70 as wheel 52 is not deployed. In this condition vehicle 12 is separating from guide rail 72. However, springs 124 and 126 are still providing the vehicle's laterally sprung mass 264, constrained only by the action of limiter 42, as shown by + vectors 263 and 263'. However, at the same time lateral guide wheel 40 and switch wheel 64 having deployed are being urged inwardly by spring 152 providing an inward vector 262, and an outward vector 260 against both switching surface 76 and guiding surface 80 thereby securely gripping rail 78 and treating car 12 as a sprung mass even though it has no connection with guide rail 72.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. An in-vehicle switch mechanism for guiding a vehicle along a guideway at converging and diverging points of the guide rails in a guided vehicle system, the switch mechanism comprising:
   a support frame;
   a pivot assembly;
   a switch arm assembly pivotably mounted at its proximate end to said pivot assembly;
   a switch wheel rotatably mounted to said switch arm assembly at its distal end;
   an actuator for moving said switch arm between a deployed position in which said switch wheel engages a said guide rail and a stowed position in which said switch wheel is free of a said guide rail;
   a biasing device interconnected between said support frame and pivot assembly for preloading said switch wheel against a said guide rail when the switch wheel is deployed as the vehicle approaches a point of divergence; and
   a biased lateral guide wheel rotatably mounted to said support frame for opposing a said switch wheel when said switch wheel is deployed.

2. The in-vehicle switch mechanism of claim 1 in which said pivot assembly includes first and second spaced pivot units.

3. The in-vehicle switch mechanism of claim 2 in which said pivot assembly includes first and second pivot arms the proximate end of each said pivot arm connected to one of said pivot units, the distal end of each said pivot arm connected to a spindle housing.

4. The in-vehicle switch mechanism of claim 3 in which said spindle housing includes a shaft for rotatably supporting said switch wheel.

5. The in-vehicle switch mechanism of claim 1 in which said biasing device includes a spring member.

6. The in-vehicle switch mechanism of claim 2 in which said biasing device includes a spring member associated with each of said pivot units.

7. The in-vehicle switch mechanism of claim 1 in which said actuator is mounted with said pivot assembly.

8. The in-vehicle switch mechanism of claim 1 in which said biasing device includes an adjustment member for varying the force applied by said biasing device.

9. The in-vehicle switch mechanism of claim 1 in which the pivot axis of said pivot assembly is generally aligned with the switch wheel.

10. The in-vehicle switch mechanism of claim 1 in which said actuator is resiliently interconnected between said pivot assembly and said switch arm assembly.

11. The in-vehicle switch mechanism of claim 10 in which said actuator is resiliently mounted to said pivot assembly.

12. The in-vehicle switch mechanism of claim 1 further including an anti-roll device for mounting alignment between said switch wheel and guide rail.

13. The in-vehicle switch mechanism of claim 1 in which said biasing device includes a limiter member for limiting the movement of said switch wheel relative to and maintaining a mechanical interference lock with said guide rail.

14. The in-vehicle switch mechanism of claim 1 in which said pivot assembly includes a sensor for detecting the position of said switch arm assembly.

15. The in-vehicle switch mechanism of claim 1 in which said biasing device includes a sensor for detecting the engagement of said switch wheel and guide rail.

16. An in-vehicle switch system for guiding a vehicle along a guideway at converging and diverging points of the guide rails in a guided vehicle system, the switch mechanism comprising:
   first and second switch mechanisms each including:
   a support frame;
   a pivot assembly;
   a switch am assembly pivotably mounted at its proximate end to said pivot assembly;
   a switch wheel rotatably mounted to said switch arm assembly at its distal end;
   an actuator for moving said switch arm between a deployed position in which said switch wheel engages a said guide rail and a stowed position in which said switch wheel is free of a said guide rail;
   a biasing device interconnected between said support frame and pivot assembly for preloading said switch wheel against a said guide rail when the switch wheel is deployed as the vehicle approaches a point of divergence; and
   a biased lateral guide wheel rotatably mounted to said support frame for opposing a said switch wheel when said switch wheel is deployed.

17. The in-vehicle switch system of claim 16 including a limiter link interconnected between said pivot assemblies for constraining one switch wheel to be stowed while the other is deployed.

18. The in-vehicle switch system of claim 17 in which said biasing device includes a limiter member for limiting the movement of said switch wheel relative to and maintaining a mechanical interference lock with said guide rail.

19. The in-vehicle switch system of claim 16 further including a lateral suspension system including first and second lateral guide wheels for engaging said guide rails, one said guide wheel rotatably mounted with each of said support frames and a biasing system interconnecting said support frames for biasing said lateral guide wheels against said guide rails in opposition to said switch wheels when they are engaged with said guide rails.

20. An in-vehicle switch mechanism for guiding a vehicle along a guideway at converging and diverging points of the guide rails in a guided vehicle system, the switch mechanism comprising:
   a support frame;
   first and second pivot assemblies;
   first and second switch arm assemblies, said first switch arm assembly pivotably mounted at its proximate end to the first pivot assembly, and said second switch arm assembly mounted at its proximate end to the second pivot assembly;

first and second switch wheels, said first switch wheel rotatably mounted to the first switch arm assembly at the distal end, and said second switch wheel mounted to the second switch arm assembly at the distal end;

first and second actuators for moving said switch arm assemblies between a deployed position in which the said first switch wheel engages a said guide rail and a stowed position in which the said second switch wheel is free of a said guide rail;

first and second biasing devices interconnected between said support frame and said pivot assemblies for pre-loading a said switch wheel against a said guide rail when a said switch wheel is deployed as the vehicle approaches a point of divergence;

first and second biased lateral guide wheels rotatably mounted to said support frame for opposing a said switch wheel when said switch wheel is deployed; and a lateral limit link between said first and second biased lateral guide wheels.

* * * * *